US006844059B2

(12) United States Patent
Bernd et al.

(10) Patent No.: US 6,844,059 B2
(45) Date of Patent: Jan. 18, 2005

(54) LONG-FIBER-REINFORCED POLYOLEFIN STRUCTURE, PROCESS FOR ITS PRODUCTION, AND MOLDINGS PRODUCED THEREFROM

(75) Inventors: Heinz Bernd, Heppenheim (DE); Joachim Heydweiller, Ruesselsheim (DE); Heribert Wunder, Hattersheim (DE)

(73) Assignee: Ticona GmbH, Kelsterback (DE)

( * ) Notice: Subject to any disclaimer, the term of this patent is extended or adjusted under 35 U.S.C. 154(b) by 0 days.

(21) Appl. No.: 10/214,060

(22) Filed: Aug. 7, 2002

(65) Prior Publication Data

US 2003/0096898 A1 May 22, 2003

(30) Foreign Application Priority Data

Aug. 7, 2001 (DE) .......................... 101 37 924

(51) Int. Cl.⁷ .................... B32B 19/02; B32B 19/04
(52) U.S. Cl. .................. 428/357; 428/364; 428/372; 428/373; 428/374; 428/375; 428/396; 428/397; 428/401; 524/502; 524/538
(58) Field of Search ............... 428/357, 364, 428/372, 373, 374, 375, 396, 397, 401; 524/538, 502

(56) References Cited

U.S. PATENT DOCUMENTS

| 5,008,356 A | 4/1991 | Ishimaru et al. ............. 526/281 |
| 5,087,677 A | 2/1992 | Brekner et al. ............. 526/132 |
| 5,428,098 A | * 6/1995 | Brekner et al. ............. 524/494 |
| 5,834,056 A | 11/1998 | Lutz ........................... 427/175 |

FOREIGN PATENT DOCUMENTS

| DE | 109 224 | 10/1974 |
| DE | 203 059 | 10/1983 |
| DE | 237 070 | 7/1986 |
| DE | 4413501 | 10/1995 |
| EP | 0 156 464 | 2/1985 |
| EP | 0 317 262 | 11/1988 |
| EP | 0 407 870 | 7/1990 |
| EP | 0 451 858 | 10/1991 |
| EP | 0 485 893 | 11/1991 |
| EP | 0 503 422 | 3/1992 |
| EP | 0 756 536 | 4/1995 |
| FR | 2 407 951 | 6/1979 |
| GB | 2 225 584 | 6/1990 |
| JP | 56-30451 | 3/1981 |
| JP | 60-104136 | 6/1985 |
| JP | 61026939 | 2/1986 |
| JP | 63-305148 | 12/1988 |
| JP | 01087656 | 3/1989 |
| JP | 64-66268 | 3/1989 |
| JP | 64-87656 | 3/1989 |
| JP | 2-107664 | 4/1990 |
| JP | 3-124748 | 5/1991 |
| JP | 03 207739 | 11/1991 |
| JP | 6-18929 | 1/1994 |
| JP | 6-234896 | 8/1994 |
| JP | 6-322266 | 11/1994 |
| JP | 7-53861 | 2/1995 |
| JP | 3-126740 | 5/1995 |

* cited by examiner

*Primary Examiner*—Ana Woodward
(74) *Attorney, Agent, or Firm*—Connolly Bove Lodge & Hutz LLP

(57) ABSTRACT

The present invention relates to long-fiber-reinforced polyolefin structures of length ≧3 mm, which comprise a) from 0.1 to 90% by weight of at least one polyolefin other than b), b) from 0.1 to 50% by weight of at least one amorphous cycloolefin polymer, c) from 5.0 to 75% by weight of at least one reinforcing fiber, and d) up to 10.0% by weight of other additives, a process for their production, and moldings produced therefrom. The moldings of the invention have reduced warpage and increased precision of fit.

27 Claims, No Drawings

LONG-FIBER-REINFORCED POLYOLEFIN STRUCTURE, PROCESS FOR ITS PRODUCTION, AND MOLDINGS PRODUCED THEREFROM

The present invention relates to a long-fiber-reinforced polyolefin structure and moldings produced therefrom with very good impact strength, with high heat resistance (HDT), and with markedly reduced warpage. The present invention further relates to the production and use of the moldings produced.

Polyolefins, in particular those of the polyethylene and polypropylene groups, are low-cost, low-density thermoplastics which melt readily and are resistant to chemicals. These materials therefore have many uses in areas such as general household items and electrical and electronic parts. However, polyolefins usually have low heat resistance (HDT) and modest mechanical properties. These plastics are therefore unsuitable for use in areas which require high heat resistance and high mechanical strength.

It was known that a reinforcing fiber, such as glass fiber, can be mixed with the polyolefin to improve its strength. The fiber-reinforced polyolefin composition obtained was usually one in which a polyolefin was mixed with short reinforcing fibers, and the mixture was then extruded. However, a disadvantage of this process is that the fibers break during grinding within the extruder. This process cannot therefore fulfil the requirement for relatively high mechanical strength of the moldings obtained.

It was also known that a polyolefin can be reinforced with long fibers, utilizing the character of the reinforcing fiber for the polyolefin with which it is to be mixed. One way of obtaining a long-fiber-reinforced polyolefin structure of this type is to unwind a continuous reinforcing fiber and immerse this in an emulsion or solution of a polyolefin, or in a polyolefin melt. The long-fiber-reinforced polyolefin has better mechanical properties than the short-fiber-reinforced polyolefin described above.

It is known that use is preferably made of a modified polyolefin, since it bears functional groups with high affinity for the polyamide. The result is an increase in affinity between the polyolefin and the polyamide, and therefore an improvement in capability for developing the network structure. The effect cannot become established if the proportion of modified polyolefin is less than 1% by weight. If the proportion exceeds 50% by weight, the viscosity of the composition rises, and this can lead to difficulties during molding.

The polyolefin may be prepared by polymerization of ethylene or of an α-olefin, such as polypropylene, using a suitable catalyst.

If the proportion of reinforcing fiber is less than 10 parts by weight, the fiber achieves only a slight reinforcing effect. If the proportion of reinforcing fiber exceeds 200 parts by weight, the production of the rod-shaped structure becomes difficult, or there is considerable impairment of molding capability.

Compositions comprising polyolefin and glass fiber are known from the prior art. These compositions are described in JP-A 03126740, JP-A 03124748, GB-A 2225584, JP-A 02107664, JP-A 01087656, JP-A 01066268, JP-A 63305148, JP-B 06018929, JP-A 60104136, JP-B 61026939, JP-A 56030451, JP-A 6322266, JP-A 7053861, and JP-A 6234896, inter alia.

Many applications demand a long-fiber-reinforced polyolefin structure. When these materials are used it is not only mechanical properties which are improved over those of unreinforced or short-fiber-reinforced materials: warpage of injection moldings produced therefrom is also reduced. However a disadvantage is that moldings which have self-supporting walls without bracing continue to have high plane warpage.

It is known that this planar warpage can be reduced via appropriate design of the molds and process parameters, e.g. increased hold pressure time. However, this method cannot give a sufficient reduction of warpage—either planar warpage or angular warpage—and the accuracy of fit of the resultant moldings is therefore inadequate for many applications.

The object of the present invention is to provide a long-fiber-reinforced polyolefin structure with very good mechanical properties, good heat resistance, and low water absorption, and also low warpage.

The object of the present invention is achieved by means of a long-fiber-reinforced polyolefin structure of length $\geq 3$ mm, which comprises a) from 0.1 to 90% by weight of at least one polyolefin other than b), b) from 0.1 to 50% by weight of at least one amorphous cycloolefin polymer, c) from 5.0 to 75% by weight of at least one reinforcing fiber, and d) up to 10.0% by weight of other additives.

The present invention is characterized by the use of at least one amorphous cycloolefin copolymer. Unexpectedly and surprisingly, the resultant long-fiber-reinforced polyolefin structure has very good mechanical properties, very good heat resistance, and low water absorption. Moldings produced from this long-fiber-reinforced polyolefin structure have not only good mechanical properties but also surprisingly low angular warpage and planar warpage. The moldings produced therefrom have improved dimensioning and improved precision of fit.

One preferred embodiment of the invention is a long-fiber-reinforced polyolefin structure which comprises a) from 4.0 to 70% by weight of at least one polyolefin other than b), b) from 1.0 to 30% by weight of at least one amorphous cycloolefin polymer, c) from 10 to 65% by weight of at least one reinforcing fiber, and d) from 0.15 to 7.5% by weight of other additives.

This composition has excellent mechanical properties and heat resistance and very low water absorption and warpage.

One particularly preferred embodiment of the invention is a long-fiber-reinforced polyolefin structure which comprises a) from 30 to 70% by weight of at least one polyolefin other than b), b) from 4.0 to 20% by weight of at least one amorphous cycloolefin polymer, c) from 19 to 58% by weight of at least one reinforcing fiber, and d) from 0.2 to 5.0% by weight of other additives.

This composition has quite excellent mechanical properties, and heat resistance, and very low water absorption, and exceptionally low warpage.

According to the invention, the polyolefin a) may be obtained by addition polymerization of ethylene or of an α-olefin, such as propylene, using a suitable catalyst. Examples of the polyolefin a) are homopolymers of high, medium, or low density, such as polyethylene, polypropylene, polymethylpentene, and copolymers of these polymers. The homopolymers and copolymers may be straight-chain or branched. There is no restriction on branching as long as the material is capable of shaping. It is possible to use a mixture made from two or more of these polymers. These materials are mostly semicrystalline homopolymers of α-olefins and/or ethylene, or copolymers of these with one another. According to the invention, the preferred polyolefin used is polypropylene. The amounts present of the polyolefin in the long-fiber-reinforced polyolefin structure of the invention may moreover be from 0.1 to 20% by weight, from 20 to 24% by weight, from 25 to 30% by weight, or else from 80 to 90% by weight.

To improve heat resistance (HDT) and impact strength, some of the polyolefin may be substituted by polyamide. Various polyamides are suitable for this purpose, for example polyamides obtained by polycondensation of dicarboxylic acids, such as oxalic acid, adipic acid, suberic acid, sebacic acid, terephthalic acid, isophthalic acid, or 1,4-cyclohexanedicarboxylic acid with a diamine, such as ethylenediamine, pentamethylenediamine, hexamethylenediamine, decamethylenediamine, 1,4-cyclohexane diamine, or m-xylene diamine, polyamide compounds obtained by polymerization of a cyclic lactam, such as caprolactam or laurolactam, and polyamides obtained by copolymerization of a cyclic lactam and a dicarboxylic salt with a diamine. According to the invention, preference among these is given to nylon-6, nylon-6,6, and copolymers of these. According to the invention, particular preference is given to the polyamide nylon-6. Nylon-6 has higher heat resistance (HDT) than the polyolefin (a). Addition of nylon-6 increases the HDT and also the impact strength of the mixture. Amounts of the polyamide of from 0.1 to 50% by weight, advantageously from 1.0 to 40% by weight, particularly advantageously from 4.0 to 30% by weight, in particular from 4 to 15% by weight, may be present in the long-fiber-reinforced polyolefin structure of the invention.

The polyolefin a) other than b), preferably comprises a modified polyolefin. Amounts of the modified polyolefin of from 0.1 to 15% by weight, advantageously from 0.15 to 7.5% by weight, in particular from 1.5 to 10% by weight, may be present in the polyolefin structure of the invention. Based on the total content of (a), the modified polyolefin contains from 1 to 50% by weight of at least one of the following groups: a carboxy group, a carboxyl anhydride group, a metal carboxylate group, a carboxylic ester group, an imino group, an amino group, or an epoxy group. Examples of the modified polyolefin encompass modified polyolefin copolymers and grafted copolymers prepared by chemically introducing compounds such as the examples in the following list: maleic anhydride, fumaric anhydride, citric anhydride, N-phenylmaleimide, N-cyclohexylmaleimide, glycidyl acrylate, glycidyl methacrylate, glycidyl vinylbenzoate, N-[4-(2,3-epoxypropoxy)-3,5-dimethyl benzyl]acrylamide (AXE), alkyl methacrylate and/or derivatives of these into polyolefins, such as polypropylene, polyethylene, or ethylene-propylene copolymers, or into polyamide-grafted polyolefins. There is no limit on the degree of polymerization of the modified polyolefin, and it may also be an oligomer. Particularly preferred modified polyolefins are maleic-anhydride-modified polyethylene,
maleic-anhydride-modified polypropylene,
maleic-anhydride-modified polyethylene-polypropylene copolymer,
fumaric-anhydride-modified polyethylene,
fumaric-anhydride-modified polypropylene,
fumaric-anhydride-modified polyethylene-polypropylene copolymer,
glycidyl-methacrylate-modified polyethylene,
glycidyl-methacrylate-modified polypropylene,
AXE-modified polyethylene,
AXE-modified polypropylene, and
polyamide-grafted polyolefins.

The modified polyolefin may be used advantageously in amounts of from 0.1 to 3.5% by weight. If polyamide is present in the polyolefin structure, higher amounts of the modified polyolefin are advantageous, and in this case they may therefore in particular be from 7.5 to 15% by weight present in the long-fiber-reinforced polyolefin structure of the invention.

According to the invention, the amorphous cycloolefin polymer b) used may comprise copolymers of ethylene and/or of α-olefins with cyclic, bicyclic, and/or polycyclic olefins, where a good industrial method for preparing the cycloolefin copolymers is mostly the use of metallocene catalysts or of other transition metal compounds.

The amorphous cycloolefin copolymer, component b), advantageously comprises at least one cycloolefin copolymer containing from 0.1 to 100% by weight, preferably from 0.1 to 99.9% by weight, based on the total weight of the cycloolefin copolymer, of polymerized units which derive from at least one polycyclic olefin of the formulae I, II, II', III, IV, V or VI

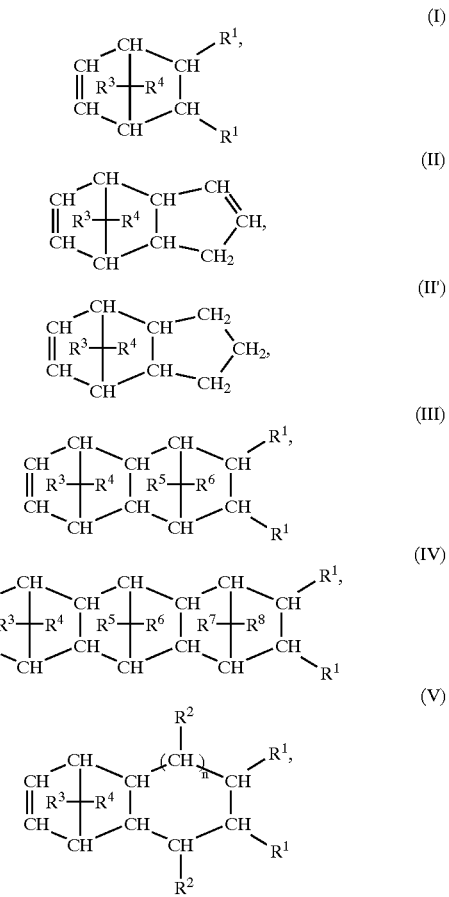

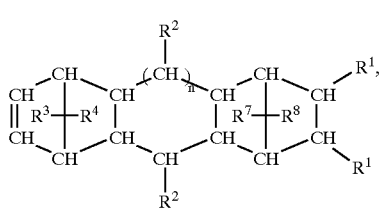
(VI)

where $R^1$, $R^2$, $R^3$, $R^4$, $R^5$, $R^6$, $R^7$ and $R^8$ are identical or different and are hydrogen or a $C_1$–$C_{20}$-hydrocarbon radical, such as a linear or branched $C_1$–$C_8$-alkyl radical, $C_6$–$C_{18}$-aryl radical, $C_7$–$C_{20}$-alkylenearyl radical, a cyclic or acyclic $C_2$–$C_{20}$-alkenyl radical, or form a saturated, unsaturated or aromatic ring, where the same radicals $R^1$ to $R^8$ may be different in the different formulae I to VI and where n is from 0 to 5, and containing from 0 to 99.9% by weight, preferably from 0.1 to 99.9% by weight, based on the entire structure of the cycloolefin copolymer, of polymerized units derived from one or more acyclic olefins of the formula VII

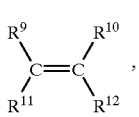
(VII)

where $R^9$, $R^{10}$, $R^{11}$ and $R^{12}$ are identical or different and are hydrogen or a linear or branched, saturated or unsaturated $C_1$–$C_{20}$-hydrocarbon radical, such as a $C_1$–$C_8$-alkyl radical or a $C_6$–$C_{18}$-aryl radical.

The cycloolefin copolymers used according to the invention may moreover contain from 0 to 45% by weight, based on the total weight of the cycloolefin copolymer, of polymerized units derived from one or more monocyclic olefins of the formula VIII

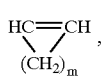
(VIII)

where m is a number from 2 to 10.

The cyclic olefins also include derivatives of these cyclic olefins having polar groups, such as halo, hydroxyl, ester, alkoxy, carboxyl, cyano, amido, imido, or silyl groups.

For the purposes of the invention, preference is given to cycloolefin copolymers which contain polymerized units deriving from polycyclic olefins of the formula I or III, and polymerized units deriving from acyclic olefins of the formula VII.

Particular preference is given to cycloolefin copolymers which contain polymerized units deriving from olefins based on a norbornene structure, particularly preferably from norbornene, tetracyclododecene and, where appropriate, vinylnorbornene or norbornadiene.

Particular preference is also given to cycloolefin copolymers which contain polymerized units derived from acyclic olefins having terminal double bonds, such as α-olefins having from 2 to 20 carbon atoms, particularly preferably ethylene or propylene. Very particular preference is given to norbornene-ethylene copolymers and tetracyclododecene-ethylene copolymers.

Among the terpolymers, particular preference is given to norbornene-vinylnorbornene-ethylene terpolymers, norbornene-norbornadiene-ethylene terpolymers, tetracyclododecene-vinylnorbornene-ethylene terpolymers and tetracyclododecene-vinyltetracyclododecene-ethylene terpolymers, or norbornene-dicyclopentadiene-ethylene. The proportion of the polymerized units derived from a polyene, preferably vinylnorbornene or norbornadiene, is from 0.1 to 50 mol %, particularly preferably from 0.1 to 20 mol %, and the proportion of the acyclic monoolefin of the formula VII is from 0 to 99.9 mol %, preferably from 5 to 80 mol %, based on the entire structure of the cycloolefin polymer. In the terpolymers described, the proportion of the polycyclic monoolefin is from 0.1 to 99.9 mol %, preferably from 3 to 75 mol %, based on the entire structure of the cycloolefin polymer.

Other suitable polymers are described in EP-A-317262. Hydrogenated polymers and copolymers, such as those of styrene or dicyclopentadiene, and other amorphous polyolefins, are expressly also suitable.

The cycloolefin copolymers used according to the invention may be prepared at temperatures of from −78 to 200° C. and at a pressure of from 0.01 to 200 bar, in the presence of one or more catalyst systems which comprise at least one transition metal compound and, where appropriate, a cocatalyst, and, where appropriate, a support material. Suitable transition metal compounds are metallocenes, in particular stereorigid metallocenes. Examples of catalyst systems which are suitable for preparing the cycloolefin copolymers of the invention are described in U.S. Pat. No. 5,008,356, EP-A-0 407 870, EP-A-0 485 893, and EP-A-0 503 422. These publications are expressly incorporated herein by way of reference. The disclosure of these publications is therefore part of the present patent application.

Examples of transition metal compounds used are:

rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl-(9-fluorenyl)(cyclopentadienyl)zirconium dichloride,
diphenylsilyl-(9-fluorenyl)(cyclopentadienyl)zirconium dichloride,
bis(1-indenyl)zirconium dichloride,
diphenylmethylene-(9-fluorenyl)cyclopentadienylzirconium dichloride,
isopropylene-(9-fluorenyl)cyclopentadienylzirconium dichloride,
rac-isopropylidenebis(1-indenyl)zirconium dichloride,
phenylmethylmethylene-(9-fluorenyl) cyclopentadienylzirconium dichloride,
isopropylene-(9-fluorenyl)(1-(3-isopropyl) cyclopentadienyl)zirconium dichloride,
isopropylene-(9-fluorenyl)(1-(3-methyl)cyclopentadienyl) zirconium dichloride,
diphenylmethylene-(9-fluorenyl)(1-(3-methyl) cyclopentadienyl)zirconium dichloride,
methylphenylmethylene-(9-fluorenyl)(1-(3-methyl) cyclopentadienyl)-zirconium dichloride,
dimethylsilyl-(9-fluorenyl)(1-(3-methyl)cyclopentadienyl) zirconium dichloride,
diphenylsilyl-(9-fluorenyl)(1-(3-methyl)cyclopentadienyl) zirconium dichloride,
diphenylmethylene-(9-fluorenyl)(1-(3-tert-butyl) cyclopentadienyl)zirconium dichloride, isopropylene-(9-fluorenyl)(1-(3-tert-butyl)
cyclopentadienyl)zirconium dichloride,
isopropylene(cyclopentadienyl)(1-indenyl)zirconium
dichloride,
diphenylcarbonyl(cyclopentadienyl)(1-indenyl)zirconium
dichloride,
dimethylsilyl(cyclopentadienyl)(1-indenyl)zirconium
dichloride,
isopropylene(methylcyclopentadienyl)(1-indenyl)zirconium
dichloride,
4-($\eta^5$-cyclopentadienyl)-4,7,7-trimethyl($\eta^5$-4,5,6,7-tetrahydroindenyl-zirconium dichloride,
[4-($\eta^5$-cyclopentadienyl)-4,7,7-triphenyl-($\eta^5$-4,5,6,7-tetrahydroindenyl)]zirconium dichloride,
[4-($\eta^5$-cyclopentadienyl)-4,7-dimethyl-7-phenyl-($\eta^5$-4,5,6,7-tetrahydroindenyl)]zirconium dichloride,
[4-($\eta^5$-3'-tert-butylcyclopentadienyl)-4,7,7-triphenyl-($\eta^5$-4,5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)-4,7,7-trimethyl-($\eta^5$-4,5,6,7-tetrahydroindenyl)]zirconium dichloride,
[4-($\eta^5$-3'-methylcyclopentadienyl)-4,7,7-triphenyl-($\eta^5$-4,5,6,7-tetrahydroindenyl)]zirconium dichloride,
[4-($\eta^5$-3'-methylcyclopentadienyl)-4,7-dimethyl-7-phenyl-($\eta$5-4,5,6,7-tetrahydroindenyl)]zirconium dichloride,
[4-($\eta^5$-3'-isopropylcyclopentadienyl)-4,7,7-trimethyl-($\eta^5$-4,5,6,7-tetrahydroindenyl)]zirconium dichloride,
[4-($\eta^5$-3'-isopropylcyclopentadienyl)-4,7,7-triphenyl-($\eta^5$-4,5,6,7-tetrahydroindenyl)]zirconium dichloride,
[4-($\eta^5$-3'-isopropylcyclopentadienyl)-4,7-dimethyl-7-phenyl-($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta$5-cyclopentadienyl)-4-phenyl($\eta^5$-4,5-tetrahydropentalene)]zirconium dichloride,
[4-($\eta^5$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzylcyclopentadienyl)($\eta^5$-4,5-tetrahydropentalene)]zirconium dichloride,
[2,2,4-trimethyl-4-($\eta^5$-cyclopentadienyl)($\eta^5$-4,5-tetrahydropentalene)]zirconium dichloride,
[2,2,4-trimethyl-4-($\eta^5$-(3,4-diisopropyl)cyclopentadienyl)($\eta^5$-4,5-tetrahydropentalene)]zirconium dichloride.

The cycloolefin copolymers may also be prepared by other routes described in outline below: Catalyst systems based on mixed catalysts of titanium salts and organoaluminum compounds are described in DD-A-109 224 and DD-A-237 070. EP-A-0 156 464 describes the preparation using vanadium-based catalysts. These cycloolefin copolymers may also be prepared via ring-opening polymerization of at least one of the monomers having the formulae I to VI and then hydrogenating the resultant products. The polymerization may also take place in two or more stages, and it is also possible for block copolymers to be produced (DE-A-42 05 416).

According to the invention, the reinforcing fiber c) is not restricted to a particular material. Use may be made of reinforcing fibers made from material with high melting point (softening point), such as talc, wollastonite, glass fiber, carbon fiber, metal fiber, or aromatic polyamide fiber. According to the invention, preference is given to the use of glass fiber. The glass fibers used are usually bundles with fiber diameter of from to 8 to 25 μm and with weight of from 500 to 4400 g per 1000 m. The fibers may have been surface-treated in a manner known per se. The amount of the reinforcing fiber present in the long-fiber-reinforced polyolefin structure of the invention may moreover be from 5 to 16% by weight or from 50 to 75% by weight.

The fiber bundles are obtained by taking a number of fibers, treating these with an aqueous solution or aqueous emulsion of a size system, and then bundling the fibers. Preference is given to the use of wound fiber bundles which are bundled, dried, and wound onto packages (direct roving). The result is substantially continuous fiber bundles.

Other additives may also be present in the polyolefin structure, for example lubricants, dyes, pigments, antioxidants, heat stabilizers, light stabilizers, reinforcing agents, or hydrolysis stabilizers.

The other additives preferably present in the long-fiber-reinforced polyolefin structure of the invention preferably comprise at least one antioxidant and/or UV stabilizer and, where appropriate, color masterbatch.

Other suitable additives are compounds selected from the group consisting of amines, amides, acid amides, polyamides, and similar classes of substances.

The amount of antioxidant present in the long-fiber-reinforced polyolefin structure is from 0.1 to 4.0% by weight, preferably from 0.15 to 3.0% by weight, particularly preferably from 0.2 to 2.0% by weight.

The amount of UV stabilizer present in the long-fiber-reinforced polyolefin structure is from 0.1 to 4.0% by weight, preferably from 0.15 to 3.0% by weight, and particularly preferably from 0.2 to 2.0% by weight.

The amount of color masterbatch present in the long-fiber-reinforced polyolefin structure is from 0.1 to 4.0% by weight, preferably from 0.15 to 3.0% by weight, and particularly preferably from 0.5 to 1.5% by weight.

According to the invention, the long-fiber-reinforced polyolefin structure may be a glass fiber bundle which has been sheathed by one or more layers of synthetic polymer in such a way that the fibers have not been impregnated and mixing of the fibers and the synthetic polymer does not occur before processing, for example by injection molding. However, the fibers have preferably been impregnated with synthetic polymer.

According to the invention, the long-fiber-reinforced polyolefin structure is advantageously produced by the pultrusion process, where I) fiber bundles are inducted through a flat die charged with a melt made from polyolefin (a), from amorphous cycloolefin polymer (b) and, where appropriate, from other additives (d), II) the immersed fiber bundles are conducted through a shaping die, III) the fiber bundles are cooled, IV) the fiber bundles are postformed, and V) the fiber bundles are cut through the length of the structure perpendicular to their running direction, or are wound up in the form of a continuous structure.

The impregnation of the fiber bundles with synthetic polymer, for example via pultrusion in step I) of the above process, may also take place by other suitable processes. For example, the fibers may be impregnated by a process in which the fiber bundle is saturated by a matrix material, where the fiber bundle is laid onto carrier equipment, and wherein the carrier equipment, together with the fiber bundle lying thereon, is conducted through impregnating equipment. A process of this type is described in EP 756 536.

The fiber may also be impregnated by a process in which a plastifying extruder is used and a fiber strand is conducted by way of guide apertures and preheating equipment and is wetted with a liquid film of synthetic polymer in an impregnating apparatus and then is introduced into the plastifying extruder in which the individual fibers are chopped and mixed, the mixture being discharged in the form of a fiber-reinforced synthetic polymer composition capable of further processing, wherein the following steps are used:

a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where b) in the inlet the right-hand coating nozzle directly applies a film of synthetic polymer to one flat side of the fiber strand, while application to the second flat side takes place indirectly by pressing the fiber strand into the liquid film of synthetic polymer previously applied from the left-hand coating nozzle to the screw, whereupon the individual continuous-filament fibers are subjected to impregnating or penetrating action at the extruder screws on both flat sides of the fiber strand in an inlet and impregnating section and these sides are wetted or saturated by the liquid films of synthetic polymer, c) and then the fiber strand or the individual fibers thoroughly saturated or thoroughly impregnated with synthetic polymer are passed out of the inlet and impregnation section by way of a cutting edge into the short discharge and conveying section of a reduced-diameter barrel, and thus chopped into substantially predetermined lengths.

An example of the process of this type is described in DE 198 36 787.

The environmentally compatible and cost-effective process described of the invention gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is from 1 to 10 mm, preferably from 2 to 8 mm, and particularly preferably from 3 to 6 mm.

The invention also provides a process where the components are mixed in an extruder, and the reinforcing fiber is wetted by the melt, and the resultant material is then pelletized. The resultant pellets may be mixed with dye and/or pigment and further processed to give the component.

According to the invention, the long-fiber-reinforced polyolefin structure is also produced by the compounding process or by the direct process.

According to the invention, a shaped article is molded from the molten, where appropriate colored, long-fiber-reinforced polyolefin pellets in a manner known per se, such as injection molding, extrusion, blow molding, or compression with plastification.

According to the invention, the long-fiber-reinforced polyolefin has the shape of a rod, a strip, a ribbon, or a sheet. The shape is preferably that of a rod, obtained by using a thermoplastic to coat the surface of the fiber and therefore of the bundle composed of fiber, arranged continuously and parallel, to give a strand, and then cutting the product to the required length. The required length is between 7 and 25 mm.

According to the invention, the components other than the reinforcing fiber, may be mixed in the melt in a kneader or an extruder. The temperature is set above the melting point of the higher-melting polymer by from 5 to 100° K, preferably from 10 to 60°K. The mixing of the melt is complete after a period of from 30 seconds to 15 minutes, preferably from 1 to 10 minutes.

The nature of the long-fiber-reinforced polyolefin structure may also be such that there is substantial wetting of the fibers only by one of the components a) or b), and the impregnated fiber strand in the middle of the long-fiber-reinforced polyolefin structure has been sheathed by the respective other component, and components a) and b) have been bonded to one another at the surface. An example of a process for producing a structure of this type has been described in U.S. Pat. No. 6,090,319. A long-fiber-reinforced synthetic polymer structure of this type may be produced by a process wherein after fiber impregnation by one of the processes described above, the impregnated fiber strand is drawn continuously out of the impregnation apparatus;

the material intended for sheathing the polyolefin structure is continuously melted and, in the plastic state, is extruded through an elongate extrusion die with a completely open tubular passage in which the material intended for sheathing the polyolefin structure is present;

and the impregnated fiber strand is continuously conveyed into and through said elongate extrusion die, while at the same time the material intended for sheathing the impregnated fiber strand is extruded;

and the impregnated fiber strand is brought into contact with the molten material intended for sheathing the polyolefin structure and is coated thereby, giving a long-fiber-reinforced polyolefin structure in which there is substantial wetting of the fibers only by one of the components a) or b), and the impregnated fiber strand in the middle of the long-fiber-reinforced polyolefin structure has been sheathed by the respective other component, and components a) and b) have been bonded to one another at the surface;

the long-fiber-reinforced polyolefin structure is continuously removed from the extrusion die; and the fiber bundles are cut to give the length of the structure perpendicular to their running direction, or are wound up in the form of a continuous structure.

When this process is used, a known process, preferably the pultrusion process, is used to impregnate the reinforcing fibers c) with one of components a) and b), which, where appropriate, may comprise one or more other additives d). The resultant structure is then coated with the other component, respectively a) or b), each of which may also comprise one or more other additives d).

It is preferable for the reinforcing fibers c) to be wetted with component a), which advantageously comprises other additives d), and for the resultant strand then to be sheathed by component b), where component b) may advantageously comprise other additives d).

The components a) and b) are separated spatially from another here and advantageously comprise different other additives d).

According to the invention, the long-fiber-reinforced polyolefin structure is used for producing moldings. The moldings produced from the long-fiber-reinforced polyolefin structure of the invention have excellent mechanical properties, in particular excellent impact strength, high heat resistance, and low deformability due to water absorption. Low warpage moreover gives the moldings improved precision of fit. The moldings may be produced from the long-fiber-reinforced polyolefin structures of the invention by the known processes, such as injection molding, compression molding, or blow molding. Moldings of this type may also be obtained by mixing long-fiber-reinforced polyolefin structures which are currently commercially available with pellets made from amorphous cycloolefin polymer, and then producing the moldings by the known processes from this mixture of pellets, in such a way that the content of amorphous cycloolefin polymer in the pellet mixture and in the moldings produced therefrom corresponds to the content of amorphous cycloolefin polymer in the polyolefin structures of the invention.

According to the invention, the long-fiber-reinforced polyolefin structure is preferably used for producing uncolored or colored moldings subjected to high mechanical and thermal stress, for example moldings in motor vehicle construction, particularly since the level of odor emission in the interior of a vehicle is very low.

What is claimed is:

1. A long-fiber-reinforced polyolefin structure of length ≧3 mm, which comprises
    a) from 0.1 to 50% by weight of at least one amorphous cycloolefin polymer,
    b) from 0.1 to 90% by weight of at least one polyolefin other than a),
    c) from 5.0 to 75% by weight of at least one reinforcing fiber, and
    d) up to 10.0% by weight of at least one additive which is different from components a)–c), wherein the percentages are based on the total composition and the long-fiber-reinforced polyolefin structure is made by a process which comprises
    I) inducting a fiber bundle through a flat die charged with a melt made from said amorphous cycloolefin polymer (a), said polyolefin other than a) (b) and, optionally, from said additive (d),
    II) conducting the immersed fiber bundle through a shaping die,
    III) cooling the fiber bundle,
    IV) postforming the fiber bundle, and
    V) cutting the fiber bundle perpendicular to its running direction to give the length of the structure or winding the fiber bundle up in the form of a continuous structure.

2. The long-fiber-reinforced polyolefin structure as claimed in claim 1, which comprises
    a) from 1.0 to 30% by weight of at least one amorphous cycloolefin polymer,
    b) from 4.0 to 70% by weight of at least one polyolefin other than a),
    c) from 10 to 65% by weight of at least one reinforcing fiber, and
    d) from 0.15 to 7.5% by weight of at least one additive which is different from components a)–c).

3. The long-fiber-reinforced polyolefin structure as claimed in claim 2, wherein said additive is an antioxidant which is present from 0.15 to 3.0% by weight.

4. The long-fiber-reinforced polyolefin structure as claimed in claim 2, wherein said additive is a UV stabilizer which is present from 0.15 to 3.0% by weight.

5. The long-fiber-reinforced polyolefin structure as claimed in claim 2, wherein said additive is a color masterbatch which is present from 0.15 to 3.0% by a weight.

6. The long-fiber-reinforced polyolefin structure as claimed in claim 2, wherein the polyolefin other than a) further comprises a nylon-6 or nylon-6,6.

7. The long-fiber-reinforced polyolefin structure as claimed in claim 1, which comprises
    a) from 4.0 to 20% by weight of at least one amorphous cycloolefin polymer,
    b) from 30 to 70% by weight of at least one polyolefin other than a),
    c) from 19 to 58% by weight of at least one reinforcing fiber, and
    d) from 0.2 to 5.0% by weight of at least one additive which is different from components a)–c).

8. The long-fiber-reinforced polyolefin structure as claimed in claim 7, wherein said additive is an antioxidant which is present from 0.2 to 2.0% by weight.

9. The long-fiber-reinforced polyolefin structure as claimed in claim 7, wherein said additive is a UV stabilizer which is present from 0.2 to 2.0% by weight.

10. The long-fiber-reinforced polyolefin structure as claimed in claim 7, wherein said additive is a color masterbatch which is present from 0.5 to 1.5% by weight.

11. The long-fiber-reinforced polyolefin structure as claimed in claim 1, wherein component b) comprises a modified polyolefin.

12. The long-fiber-reinforced polyolefin structure as claimed in claim 1, wherein component b) is obtained by polymerization of an α-olefin.

13. The long-fiber-reinforced polyolefin structure as claimed in claim 1, wherein said component b) is polypropylene.

14. The long-fiber-reinforced polyolefin structure as claimed in claim 1, wherein said reinforcing fiber is talc, steel fiber, wollastonite or glass fiber.

15. The long-fiber-reinforced polyolefin structure as claimed in claim 1, wherein said length is from 3 to 100 mm.

16. The long-fiber-reinforced polyolefin Structure as claimed in claim 1, wherein the additive present is at least one antioxidant, UV stabilizer or color masterbatch or a mixture thereof.

17. The long-fiber-reinforced polyolefin structure as claimed in claim 1, wherein said additive is an antioxidant which is present from 0.1 to 4.0% by weight.

18. The long-fiber-reinforced polyolefin structure as claimed in claim 1, wherein said additive is a UV stabilizer which is present from 0.1 to 4.0% by weight.

19. The long-fiber-reinforced polyolefin structure as claimed in claim 1, wherein said additive is a color masterbatch which is present from 0.1 to 4.0% by weight.

20. The long-fiber-reinforced polyolefin structure as claimed in claim 1, wherein the polyolefin other than a) further comprises a polyamide.

21. The long-fiber-reinforced polyolefin structure as claimed in claim 1, wherein the amorphous cycloolefin polymer used comprises copolymers of α-olefins or a mixture thereof with cyclic, bicyclic or polycyclic olefins or a mixture thereof.

22. The long-fiber-reinforced polyolefin structure as claimed in claim 1, wherein the amorphous cycloolefin polymer used comprises copolymers of ethylene and norbornene.

23. The long-fiber-reinforced polyolefin structure as claimed in claim 1, wherein the structure is a glass fiber bundle and is sheathed by at least one synthetic polymer layer.

24. A molded product made from the long-fiber-reinforced polyolefin structure as claimed in claim 1, produced by injection molding, extrusion, blow molding, or compression with plastification.

25. A process for producing a fiber-reinforced molded product comprising an amorphous cycloolefin polymer, which comprises mixing long-fiber-reinforced polyolefin structures other than said cycloolefin polymer with pellets of an amorphous cycloolefin polymer and then using this mixture of pellets to produce a molded product.

26. A long-fiber-reinforced polyolefin structure of length $\geq 3$ mm, which comprises a) from 0.1 to 50% by weight of at least one amorphous cycloolefin polymer, b) from 0.1 to 90% by weight of at least one polyolefin other than a), c) from 5.0 to 75% by weight of at least one reinforcing fiber whose length is equivalent to the length of the polyolefin structure, and d) up to 10.0% by weight of at least one additive wherein the percentages are based on the total composition.

27. The long-fiber-reinforced polyolefin structure as claimed in claim 26, comprising a long-fiber reinforced composite core member comprised of one of the components a) or b) having a plurality of continuous fiber strands embedded and extending therein, and a thermoplastic coating member comprised of the other one of the components a) or b) wherein the coating member surrounds the core member, and the surfaces of the core and coating members are bonded to each other.

* * * * *